April 30, 1957 A. W. HAYDON Re. 24,310

MOTOR SPEED GOVERNOR

Original Filed Nov. 4, 1954 2 Sheets-Sheet 1

INVENTOR
Arthur W. Haydon
BY
Pennie, Edmonds, Morton, Barrows & Taylor
ATTORNEY

April 30, 1957 A. W. HAYDON Re. 24,310

MOTOR SPEED GOVERNOR

Original Filed Nov. 4, 1954 2 Sheets-Sheet 2

INVENTOR
Arthur W. Haydon
BY
Pennie, Edmonds, Morton, Barrows & Taylor
ATTORNEYS United States Patent Office Re. 24,310
Reissued Apr. 30, 1957

24,310

MOTOR SPEED GOVERNOR

Arthur W. Haydon, Milford, Conn., assignor, by mesne assignments, to Consolidated Electronics Industries Corp., Jackson, Mich., a corporation of Delaware Original No. 2,740,080, dated March 27, 1956, Serial No. 466,764, November 4, 1954. Application for reissue November 28, 1956, Serial No. 625,575

10 Claims. (Cl. 318—311)

Matter enclosed in heavy brackets [ ] appears in the original patent but forms no part of this reissue specification; matter printed in italics indicates the additions made by reissue.

This invention relates to speed governors for motors which exhibit a tendency to run at varying speeds depending upon the load thereon, changes or fluctuations in terminal voltage, etc. More particularly the invention is concerned with a motor speed governor of the type disclosed in my Patent 2,523,298 which issued on September 26, 1950. While the motor speed governor of that patent operates completely satisfactorily in all respects, it is not inexpensive to manufacture. I have therefore developed the new governor of this invention which operates on the same principle as does that of my aforementioned patent but which is considerably less expensive to manufacture, though it too gives satisfactory results.

By reference to my Patent 2,523,298 it can be seen that the principle upon which the governor of that patent operates is as follows. A motor current supply source is employed from which a motor is supplied with sufficient current to tend to cause it to operate at a speed above a predetermined desired value. The motor and current supply source are connected in a circuit which includes a pair of contacts which may be opened to terminate the supply of current to the motor and closed to initiate a supply of current to the motor. The governor includes a constant speed device which effects the closing of said contacts at constant fixed intervals completely independent of the instantaneous speed of the motor while the latter operates near the predetermined desired speed therefor. The governor also includes means responsive to the operation of the motor at speeds near the predetermined desired speed therefor for opening the contacts between successive closings thereof and at instants determined by the travel of the motor. In addition, the governor is such that the constant speed device is periodically supplied with energy from the motor through the intermediary of an energy storing means.

As previously indicated, the speed governor of this invention operates on the same principle as does that of my Patent 2,523,298 and hence includes the aforementioned components. However, as will be pointed out hereinafter, the actual construction of said components is simplified a good deal; for example, the constant speed device for closing the contacts at constant fixed intervals independent of the instantaneous speed of the motor as the latter operates near its predetermined desired speed is greatly compacted. Furthermore, the means for opening the contacts between successive closings thereof advantageously comprises a cam mounted directly on the motor shaft.

More specifically, the governor of this invention includes a pair of substantially parallel spring contact elements fixedly mounted at adjacent ends to extend one on either side of and spaced from one end of the motor shaft. A cam is mounted on the end of the motor shaft and upon rotation thereof alternately engages the spring contact elements. The spring contact elements are so mounted that the free ends thereof are normally urged into firm contact with each other. This tendency of the free ends of the spring contact elements to engage one another is not overcome merely by rotation of the motor shaft cam, for during a complete revolution of this cam independently the spring contact elements would merely be moved back and forth, remaining, however, at all times in contact with each other. The governor, however, includes, as indicated, a constant speed device which includes a cam also advantageously located between the spring contact elements. The constant speed device employed is advantageously an oscillating one whose frequency of oscillation is equal to the predetermined desired speed of the motor. The constant speed device cam also is such that it alone, if positively moved throughout its normal path, would not cause a separation of the free ends of the spring contact elements. The two cams, however, when operated together, cooperate to open and close the motor current supply circuit by engaging said spring contact elements to respectively separate the free ends thereof and then to permit contacting thereof. As is the case in the governor of my aforementioned patent, the constant speed device does not positively close the motor current supply circuit but rather permits it to close. Its function is momentarily to hold one of the spring contact elements in one of the latter's extreme positions, into which it has been moved by the motor shaft cam, while the motor shaft cam is moving the other spring contact element to its opposite extreme position and then allow the former spring contact element to move from its extreme position back into contact with the spring contact element newly moved to its oppositely disposed extreme position.

For a more detailed description of a preferred embodiment of my invention, reference may be made to the accompanying drawings in which.

Figure 2:
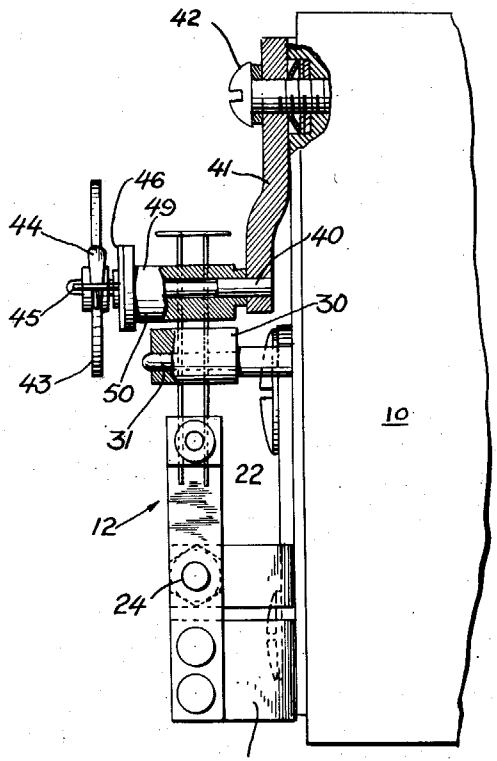
Fig. 2 is a sectional view thereof taken along line 2—2 of Fig. 1.
Figure 1:
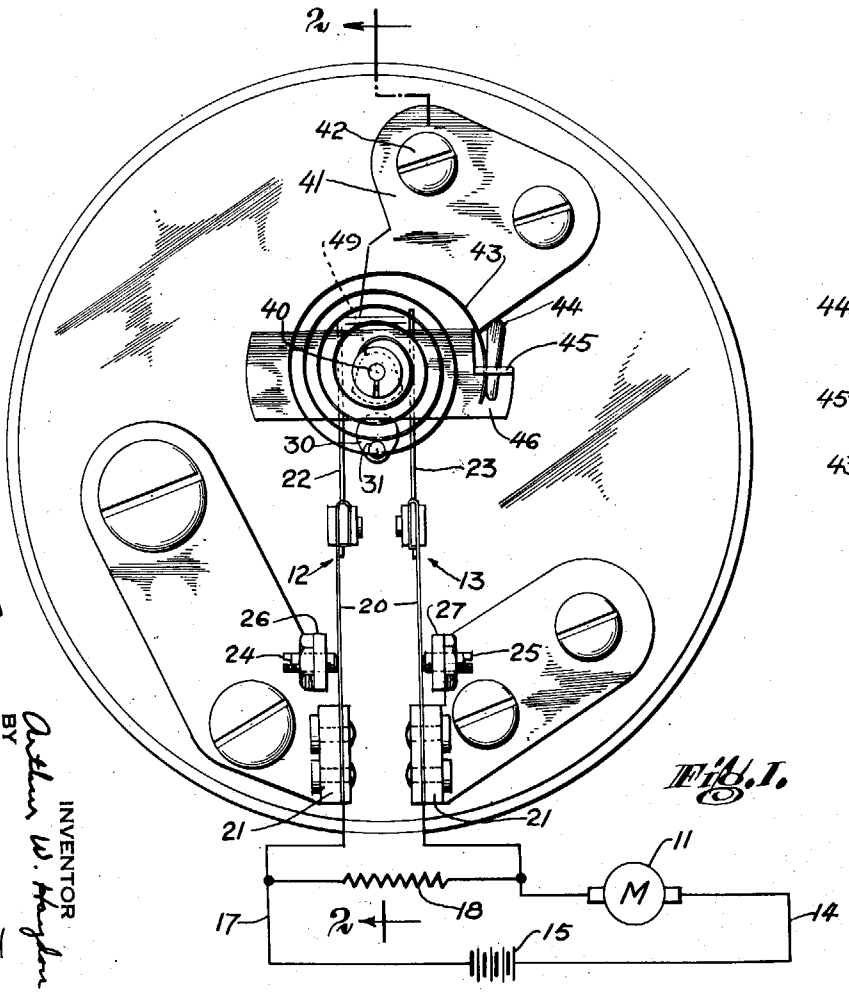
Fig. 1 is a plan view thereof.

Referring first to Figs. 1 and 2, the governor of the invention is shown mounted on the end of a motor housing 10 which contains a motor, the speed of which is to be governed. It includes a pair of spring contact elements 12 and 13 which will be described more fully hereinafter. The motor, the speed of which is to be governed, is shown schematically at 11 in Fig. 1 in order to illustrate the manner in which it is electrically connected to a current supply source and to the switch contact elements. As there shown motor 11 is connected by a connecting wire 14 to a current supply source 15 and by a connecting wire 16 to spring contact 13. The other side of current supply source 15 is connected by a connecting wire 17 to the other spring contact element 12. A resistance element 18 is connected across connecting wires 16 and 17. When spring contact elements 12 and 13 are in electrical contact with one another, motor 11 is supplied with a maximum current from source 15 which is of a value sufficient to tend to cause the motor to accelerate beyond a predetermined desired speed. When the spring contact elements are disconnected electrically, however, the motor is supplied only with a reduced amount of current by reason of resistance element 18 which is insufficient to cause the motor to operate at the predetermined desired speed. The inclusion of resistance element 18 is, it will be understood, not essential though it does tend to effect smoother operation of the motor by reason of the fact that otherwise the motor would be supplied only with maximum current or no current at all.

Each of spring contact elements 12 and 13 includes a leaf spring member 20. Adjacent ends of spring members 20 are fixedly supported by clamp type support members 21 on the end of motor housing 10. An L-shaped contact member 22 is secured firmly to the free end of spring member 20 of spring contact element 12. A contact element 23 is similarly secured to the free end of spring member 20 of spring contact element 13. The spring contact elements 12 and 13 are so positioned that contact elements 22 and 23 are normally spring urged into contact with each other. For the purpose of adjusting the degree of contact pressure between contact members 22 and 23, I provide adjusting screws 24 and 25 mounted in fixed supports 26 and 27 respectively for adjustable engagement with spring members 20 of spring contact elements 12 and 13 respectively.

A cam 30 is mounted directly on an extension of the output shaft 31 of motor 11. As may be seen clearly in Fig. 1, spring contact elements 12 and 13 are so located that one passes on either side of cam 30. As will be hereinafter described, cam 30 effects a periodic opening of the motor supply current circuit by alternately engaging and periodically separating contact elements 22 and 23. It can be noted here, however, that the size of cam 30 is such that the maximum displacement which it may impose on either spring contact 22 or spring contact 23 when the spring contact elements 12 and 13 are properly adjusted is not sufficient by itself to cause a separation of the contacting ends of the contact elements.

A constant speed device, the function of which is hereinbefore referred to, namely, to effect a closing of the motor supply current circuit (a recontacting of contact elements 22 and 23) between successive openings thereof, is located adjacent the outer ends of spring contact elements 12 and 13 and comprises a fixed post 40 mounted on a support member 41 suitably secured as by a screw 42 to the end of motor housing 10. Post 40 is so positioned that it extends from the end of the motor housing outwardly between contact elements 22 and 23. A hair spring 43 is mounted on the outer end of the post, having its inner end fixedly secured thereto. The other end of the hair spring 43 is advantageously secured by a plug 44 to a flange 45 of a balance wheel 46, the plug and outer end of the hair spring being received in an opening 47 through flange 45. The balance wheel 46 is fixedly secured to an elongated cam member 49 (which may be called the constant speed device cam) which is rotatably mounted on post 40. Cam 49 has a fantail section 50 which is adapted to alternately engage and be engaged by contact elements 22 and 23. For reasons that will hereinafter be made clear from a description of the operation of the governor in connection with Figs. 3 through 8, the size of cam 49 and its fantail 50 relative to the size of motor shaft cam 30 should be such that when either contact element 22 or contact element 23 is displaced to the maximum extent by the motor shaft cam, the constant speed device cam may pass freely to and through its position of maximum displacement. In other words, the maximum rise on the motor shaft cam 30 should be radially slightly greater than the maximum rise radially on the constant speed device cam 49. It will be noted that the centers of rotation of both cams 30 and 49 lie on a center line between spring contact elements 12 and 13.

As previously indicated, the frequency of hair spring 43 must for proper operation of the governor be equal to the speed of revolution of the motor, that is, the predetermined desired speed of the motor. The former may be adjusted by adjusting the connection between the outer end of the hair spring and balance wheel flange 45. As will be described below and as is the case with the governor disclosed in my aforementioned Patent 2,523,298, energy is supplied to the hair spring 43 from the motor through spring contact elements 12 and 13 the latter acting as intermediate energy storing means so that at no time is the character of the oscillatory motion of the hair spring dependent directly on the operation of the motor. In fact, movement of the constant speed device cam is independent of the instantaneous speed of the motor while the latter operates near the predetermined desired speed thereof, as will also be hereinafter made clear.

Figures 3, 4, 5, 6, 7, 8:
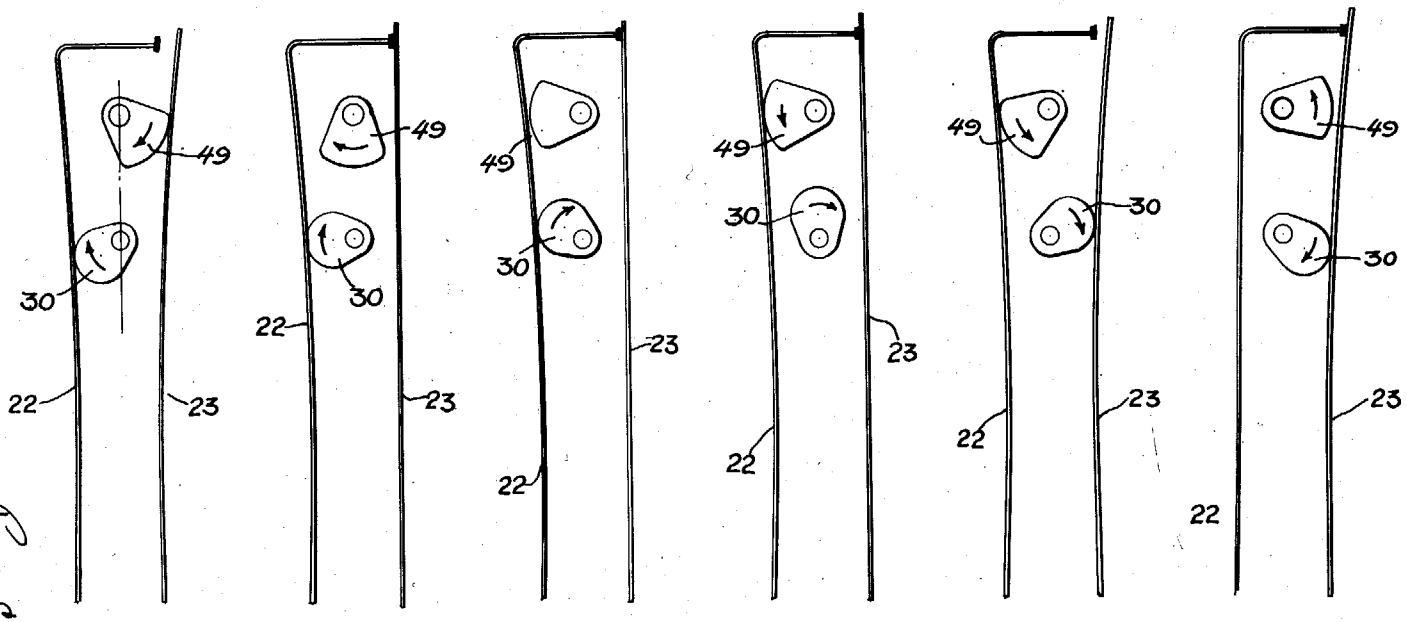
Figs. 3 through 8 are schematic illustrations of the switch contact elements and cams showing their relative conditions and positions at various instants during operation of the governor.

Turning now to Figs. 3 through 8, I have there illustrated the various relative positions of the cams 30 and 49 and of the contact elements 22 and 23 during a cycle of operation of the governor while the motor is operating at or near its predetermined desired speed. In Fig. 3 it will be noted that contact elements 22 and 23 are being moved out of contact with each other, motor shaft cam 30 just having engaged and begun movement of the contact element 22 toward the left as seen in the figure. At the same time constant speed device cam [40] *49* is in contact with contact element 23, preventing the latter's movement along with contact element 22 as would occur normally were it not for the presence of cam 49. In Fig. 4, contact element 22 is shown in its position of maximum displacement toward the left by motor shaft cam 30. The constant speed device cam 49 has now moved substantially to a central position permitting contact element 23 to move into contact with contact element 22 and is now out of contact with both contact elements 22 and 23. During movement of cam 49 from its position as shown in Fig. 3 to its position as shown in Fig. 4, its oscillating hair spring 43 has been fed some energy by reason of the fact that spring contact 23 has given the cam an energy impulse in its direction of movement. As motor shaft cam 30 moves from its position as shown in Fig. 4 to its position as shown in Fig. 5, contact element 22 is maintained substantially in its position of maximum displacement to the left. During this interval, cam 49 swings freely to the end of its travel in the clockwise direction, that is, without contacting contact element 22. It should be noted that energy has been imparted to contact element 22 by reason of its displacement from normal position by motor shaft cam 30 and this energy is stored by it until subsequently imparted to the constant speed device as indicated below.

As illustrated in Fig. 6, motor shaft cam 30 is now out of contact with both contact elements 22 and 23. Contact element 22 is, however, maintained displaced toward the left from its normal position by constant speed device cam 49. The motor speed cam then moves on into contact with contact element 23 (Fig. 7) displacing this contact element to the right. During this displacement of contact element 23 the contact between it and element 22 is broken because contact element 22 is being maintained in its displaced position to the left by cam 49.

Turning next to Fig. 8, cam 30 progresses further while maintaining contact element 23 in its displaced position to the right. During this further movement of cam 30, cam 49 moves in a counterclockwise direction, breaking contact with contact element 22 which is then permitted to be sprung to the right to again make contact with contact element 23. As cam 49 leaves its position of contact with contact element 22, it receives another energy impulse therefrom which it transmits through balance wheel 46 to hair spring 43. Before cam 30 permits contact element 23 to move under its normal spring urging toward the left, cam 49 swings to its opposite extreme position free from contact with contact element 23.

From the above it will be clear that while the energy necessary for oscillation of cam 49 by hair spring 43 is derived from the motor, it is only so derived indirectly and hair spring 43 is in complete control of the oscillation of cam 49. Also the energy impulses imparted to the constant speed device by contact elements 22 and 23 from the motor are constant in magnitude regardless of the variations in the instantaneous speed of the motor while it operates near the desired predetermined speed. It will be noted further that neither cam 30 nor cam 49 is large enough for either independently to displace either contact element 22 or 23 sufficiently far to effect a breaking of contact therebetween. Rather this can be accomplished only by a cooperation between both cams and requires that they be angularly oppositely disposed, the constant speed device cam 49 in each instance holding one of the contact elements in its position of displacement by motor speed cam 30 while the motor speed cam 30 moves on to displace the other. As will also be clear, the rise of each cam is of substantial angular extent and is substantially uniform, with respect to the degree thereof, throughout its extent.

It will be clear from the above that if the speed of the motor 11 tends to decrease by reason, for example, of an increase in load or a decrease in voltage, the periods of contact of contact elements 22 and 23 will be increased (the contact will not be broken so soon after closing) and hence more current will be supplied to the motor. Alternatively, if the speed of the motor tends to increase by reason, for example, of a decrease in load or a voltage surge, the lengths of the periods of contact of contact elements 22 and 23 will be decreased, that is, motor speed cam 30 will break the contact therebetween sooner, thereby decreasing the amount of current supplied to the motor. As the frequency of oscillation of cam 49 is maintained constant by hair spring 43, contact between contact elements 22 and 23 is maintained or reestablished if broken at constant intervals. Thus, as indicated, the governing effect is accomplished by a variation of the instants of opening or breaking of the contact between contact elements 22 and 23. If a more detailed description of this principle of operation is desired, reference may be had, as previously suggested, to my Patent 2,523,298.

As is the case with the governor of my aforementioned patent, a governor according to this invention has a reversible driving connection between the motor and the constant speed device so that it will perform its function regardless of the direction of operation of the motor. Furthermore the governor of this invention is, as is that of my aforementioned patent, reliably self starting as will be clear to those skilled in the art. Important in this respect, however, is the fact that the angular extent of the rise on the constant speed device cam must be such that this cam will, during an initial movement of spring contacts 22 and 23, be engaged by one to initiate oscillatory movement thereof. Hence it will be noted from Fig. 1 that when motor shaft cam 30 is turned in either direction to displace one or the other of contact elements 22 or 23, the other which follows will contact the fantail 50 of cam 49.

I claim:

1. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contact elements being normally urged toward and into contact with each other, a motor driven cam located between said spring contact elements and alternately engageable therewith, and a constant speed device including a cam located between said spring contact elements and alternately engageable therewith, said cams cooperating with one another while said motor is operating near said predetermined value to open said circuit by displacing said spring contact elements sufficiently to break contact therebetween at times dependent upon the speed of the motor and to allow said spring contact elements to be urged relatively toward and in contact with one another to close said circuit between successive openings thereof at times determined by said constant speed device independently of said motor.

2. A governor for a variable speed motor according to claim 1 in which the relative sizes of the cams is such that the maximum displacement of either spring contact element by the motor driven cam is slightly greater than the maximum displacement that could be effected by the constant speed device cam.

3. A governor for a variable speed motor according to claim 1 in which the angular extent of the rise of the constant speed device cam is such that the cam will be engaged by one of said spring contact elements during movement of the other of said spring contact elements to an extreme displacement by said motor driven cam.

4. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contact elements lying one on either side of an extension of the shaft of said motor and being normally urged toward and into contact with each other, a motor driven cam mounted directly on said motor shaft and located between said spring contact elements and alternately engageable therewith, and a constant speed device including a cam located between said spring contact elements and alternately engageable therewith, said cams cooperating with one another while said motor is operating near said predetermined value to open said circuit by displacing said spring contact elements sufficiently to break contact therebetween at times dependent upon the speed of the motor and to allow said spring contact elements to be urged relatively toward and in contact with one another to close said circuit between successive openings thereof at times determined by said constant speed device independently of said motor.

5. A governor for a variable speed motor according to claim 4 in which said constant speed device comprises a fixed post extending between said spring contact elements, said constant speed device cam being rotatably mounted thereon, a balance wheel fixedly secured to said cam for rotation therewith about said post, and a hair spring one end of which is secured to said post and the other end of which is secured to said balance wheel.

6. A governor for a variable speed motor according to claim 5 in which the hair spring is so secured to said post and to said balance wheel that its frequency is equal to the predetermined desired speed of the motor.

7. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contact elements being normally urged toward and into contact with each other, a motor driven cam located adjacent said spring contact elements and alternately operable thereupon, and a constant speed device including a cam located between said spring contact elements and alternately engageable therewith, said cams cooperating with one another while said motor is operating near said predetermined value to open said circuit by displacement of said spring contact elements sufficiently to break contact therebetween at times dependent upon the speed of the motor and to allow said spring contact elements to be urged relatively toward and in contact with one another to close said circuit between successive openings thereof at times determined by said constant speed device independently of said motor.

8. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contact elements being normally urged toward and into contact with each other, a motor driven cam located between said spring contact elements and alternately engageable therewith, and a constant speed device including a cam located adjacent said spring contact elements and alternately operable thereupon, said cams cooperating with one another while said motor is operating near said predetermined value to open said circuit by displacement of said spring contact elements sufficiently to break contact therebetween at times dependent upon the speed of the motor and to allow said spring contact elements to be urged relatively toward and in contact with one another to close said circuit between successive openings thereof at times determined by said constant speed device independently of said motor.

*9. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contact elements lying adjacent an extension of the shaft of said motor and being normally maintained in contact with each other, a motor driven cam mounted directly on said motor shaft and located adjacent said spring contact elements and engageable therewith, and a constant speed device including a cam located adjacent said spring contact elements and engageable therewith, said cams cooperating with one another while said motor is operating near said predetermined value to open said circuit by displacing said spring contact elements sufficiently to break contact therebetween at times dependent upon the speed of the motor and to allow said spring contact elements to move relatively toward and in contact with one another to close said circuit between successive openings thereof at times determined by said constant speed device independently of said motor.*

*10. A governor for a variable speed motor comprising a combination of an electric circuit for supplying sufficient current to the motor to tend to cause the same to operate at a speed above a predetermined value, a pair of spring contact elements in said circuit for opening and closing said circuit, said spring contacts being normally maintained in contact with each other, a motor driven cam located adjacent said spring contact elements and engageable therewitth, and a constant speed device including a cam located adjacent said spring contact elements and operable thereupon, said cams cooperating with one another while said motor is operating near said predetermined value to open said circuit by displacement of said spring contact elements sufficiently to break contact therebetween at times dependent upon the speed of the motor and to allow said spring contact elements to move relatively toward and in contact with one another to close said circuit between successive openings thereof at times determined by said constant speed device independently of said motor.*

No references cited.